United States Patent
Otsuka

(10) Patent No.: US 8,201,881 B2
(45) Date of Patent: Jun. 19, 2012

(54) CLUTCH MECHANISM FOR VEHICLE SEAT

(75) Inventor: Taiyo Otsuka, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 473 days.

(21) Appl. No.: 12/555,204

(22) Filed: Sep. 8, 2009

(65) Prior Publication Data

US 2010/0060048 A1   Mar. 11, 2010

(30) Foreign Application Priority Data

Sep. 10, 2008   (JP) .................................. 2008-232019

(51) Int. Cl.
   *B60N 2/427*   (2006.01)
   *B60N 2/48*   (2006.01)
(52) U.S. Cl. .............................. 297/216.12; 297/216.14
(58) Field of Classification Search ............. 297/216.12, 297/216.13, 216.14
   See application file for complete search history.

(56) References Cited

U.S. PATENT DOCUMENTS

| | | | |
|---|---|---|---|
| 7,523,987 B2 * | 4/2009 | Yamaguchi | 297/216.12 |
| 2005/0280296 A1 * | 12/2005 | Ohchi et al. | 297/216.12 |
| 2009/0126520 A1 | 5/2009 | Yamaguchi et al. | |
| 2009/0167066 A1 * | 7/2009 | Mori et al. | 297/216.12 |

FOREIGN PATENT DOCUMENTS

| | | | |
|---|---|---|---|
| DE | 102006004905 | * | 8/2006 |
| JP | 2005-95237 | | 4/2005 |

OTHER PUBLICATIONS

U.S. Appl. No. 12/555,214 entitled Clutch Mechanism for Vehicle Seat filed on Sep. 8, 2009.
English language Abstract of JP 2005-95237, Apr. 14, 2005.

* cited by examiner

*Primary Examiner* — Anthony D Barfield
(74) *Attorney, Agent, or Firm* — Greenblum & Bernstein, P.L.C.

(57) ABSTRACT

A clutch mechanism for a vehicle seat is provided. The clutch mechanism includes a pressure-receiving member rotatably assembled to a frame of a seatback, a connecting arm having a weight and provided rotatably to the pressure-receiving member, a first swinging member provided rotatably to the frame, wherein while inertia force occurring due to a crash of a vehicle from behind acts on the weight, when the pressure-receiving member rotates upon receipt of a seatback load of a passenger, the connecting arm causes the first swinging member to rotate; and a second swinging member provided rotatably to the frame of the seatback, and configured to rotate along with the rotation of the first swinging member. The second swinging member is held in a state achieved when the first swinging member rotates by a predetermined angle even when the first swinging member rotates by an angle larger than the predetermined angle.

6 Claims, 5 Drawing Sheets

CLUTCH MECHANISM FOR VEHICLE SEAT

BACKGROUND OF THE INVENTION

1. Field of the Invention

The present invention relates to a clutch mechanism for a vehicle seat.

2. Description of the Related Art

A related-art clutch mechanism for a vehicle seat is described in JP-A-200-95237. This vehicle seat includes a seatback and a headrest body supported above the seatback. The seatback includes therein an acceleration detecting mechanism, and a movement detecting mechanism which detects a movement of a passenger. Specifically, the movement detecting mechanism includes a detecting arm having extending part, and a base part which is supported rotatably to the seatback and formed with ratchet teeth. The acceleration detecting mechanism includes a swinging member with a weight which is provided rotatably to the base part and has ratchet teeth. When inertia force occurring due to a crash of a vehicle from behind acts on the weight, the swinging member rotates and the ratchet teeth of the swinging member become engagement with the ratchet teeth of the base part. In this state, upon receipt of a seatback load of a passenger on the vehicle seat, the detecting arm rotates and this rotation transmits to the swinging member, which activates the headrest body to protrude frontwardly toward the passenger's head. Accordingly, when a vehicle is crashed from behind, the back of the passenger's head can be instantaneously received.

However, according to the above-described clutch mechanism, the rotation amount of the swinging member increases as the magnitude of seatback load from a passenger increases. Therefore, for example, when receiving the seatback load from a passenger of heavy weight, the swinging member might rotate more than necessary. In the case of a vehicle seat having a configuration in which the headrest body or the like is activated in response to an operation cable being pulled by the rotation of the swinging member, if the swinging member rotates more than necessary, the excessive tensile force is exerted to the operation cable.

SUMMARY OF THE INVENTION

It is an aspect of the present invention to provide a clutch mechanism for a vehicle seat which when tensile force is exerted on an operation cable, or the like, by a seatback load of a passenger due to a crash of a vehicle from behind, enables prevention of excessive exertion of tensile force to the operation cable, or the like, even in the case of the passenger generating heavy seatback load.

According to an exemplary embodiment of the present invention, there is provided a clutch mechanism for a vehicle seat, which comprises: a pressure-receiving member rotatably assembled to a frame of a seatback of the vehicle seat; a connecting arm having a weight and provided rotatably to the pressure-receiving member; a first swinging member provided rotatably to the frame of the seatback of the vehicle seat, wherein while inertia force occurring due to a crash of a vehicle from behind acts on the weight, when the pressure-receiving member rotates upon receipt of a seatback load of a passenger of the vehicle seat, the connecting arm causes the first swinging member to rotate along with the rotation of the pressure-receiving member; and a second swinging member provided rotatably to the frame of the seatback, and configured to rotate along with the rotation of the first swinging member. The second swinging member is held in a rotated state achieved when the first swinging member rotates by a predetermined angle even when the first swinging member rotates by an angle larger than the predetermined angle.

According to this configuration, when tensile force is exerted on an operation cable, or the like, by seatback load of a passenger due to a crash of a vehicle from behind and when the passenger's seatback load is heavy, excessive exertion of the tensile force on the operation cable, or the like, can be prevented.

In the above clutch mechanism, along with the rotation of the first swinging member in a first direction, the second swinging member may rotate in a second direction opposite to the first direction.

According to this configuration, the arrangement and the configuration of the first swinging member and the second swinging member becomes simple.

In the above clutch mechanism, the first swinging member may include a rib formed at one end thereof for contacting the connecting arm, and a circular-arc surface formed at the other end thereof for contacting the second swinging member. The circular-arc surface may configure a part of a circle with a center about which the first swinging member rotates. The second swinging member may be rotated along with the rotation of the first swinging member by contacting an edge of the circular-arc surface. The second swinging member may be held in the rotated state by contacting the circular-arc surface of the first swinging member when the first swinging member rotates by more than the predetermined angle.

In the above clutch mechanism, the frame may include a rib formed with an elongated hole. The connecting arm includes a pin which is movable in the elongated hole. When the inertia force occurring due to a crash of a vehicle from behind acts on the weight, the pin of the connecting arm may move along a first surface of the elongated hole to contact with the first swinging member. When the inertia force does not act on the weight, the pin of the connecting arm moves along a second face opposite to the first surface without contacting with the first swinging member.

In the above clutch mechanism, the seatback may include a lock mechanism. The lock mechanism may be connected to the second swinging member via a transmission member. The lock mechanism may be unlocked via the transmission member along with the rotation of the second swinging member.

According to this configuration, the lock mechanism can be unlocked by utilization of rotating action of the swinging member, to thus exert tensile force on the transmission member.

In the above clutch mechanism, the seatback may include an active headrest assembled thereto, which includes a support plate which springs toward a back of the passenger's head. The support plate may be held by the lock mechanism in an initial state achieved before the support plate spring out, and may spring out toward the back of the passenger's head along with the unlocking of the lock mechanism.

According to this configuration, the support plate can be caused to spring out toward the back of the passenger's head by seatback load of the passenger occurring due to a crash of a vehicle form behind. Therefore, when the vehicle is crashed from behind, the support plate can instantaneously receive the back of the passenger's head.

DETAILED DESCRIPTION

Figure 8:
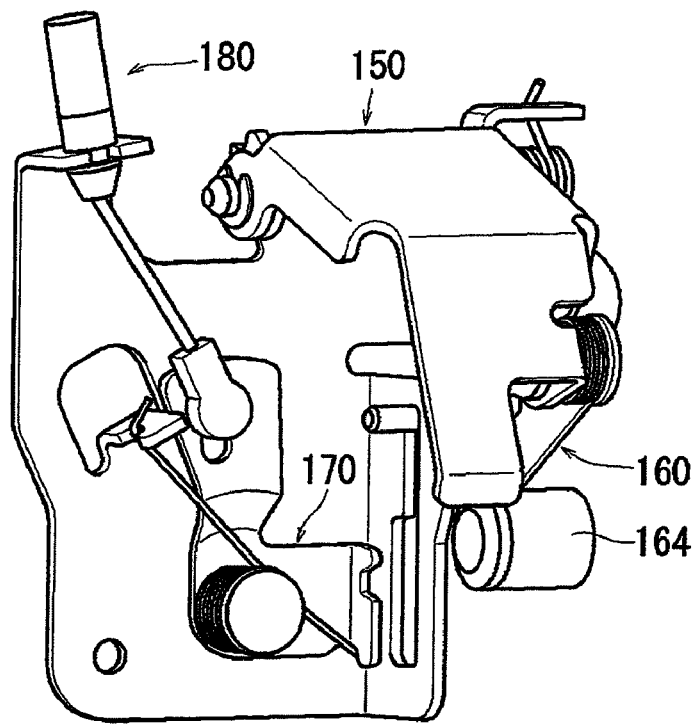
FIG. 8 is an enlarged view of a related-art clutch mechanism.

Exemplary embodiments of the present invention will described by reference to the drawings. However, firstly, a related-art clutch mechanism will be described by reference to FIG. 8. The related-art clutch mechanism shown in FIG. 8 includes a pressure-receiving member 150 rotatably assembled to a frame (not shown) of a seatback; a connecting arm 160 having a weight 164 provided rotatably to the pressure-receiving member 150; and a swinging member 170 provided rotatably to the frame of the seatback. While inertia force occurring due to a crash of a vehicle from behind acts on the weight 164, when the pressure-receiving member 150 rotates upon receipt of a seatback load of a passenger of the vehicle seat, the connecting arm 160 causes the swinging member 170 to rotate along with the rotation of the pressure-receiving member 150. Tensile force is exerted on an operation cable 180 along with the rotation of the swinging member 170, thereby momentarily activating an active headrest (not shown) toward a back of the passenger's head. Accordingly, when a vehicle is crashed from behind, the back of the passenger's head can be instantaneously received.

According to the above-described clutch mechanism, the amount of rotation motion of the swinging member 170 increases as the magnitude of the seatback load of the passenger increase. For example, upon receipt of the seatback load of a heavyweight passenger, the swinging member 170 rotates more than necessary. As a consequence, excessive tensile force might act on the operation cable 180.

The exemplary embodiments of the present invention provides a clutch mechanism for a vehicle seat which when tensile force is exerted on an operation cable, or the like, by a seatback load of a passenger due to a crash from behind, enables prevention of excessive exertion of tensile force to the operation cable, or the like, even in the case of the passenger generating heavy seatback load.

Figure 1:
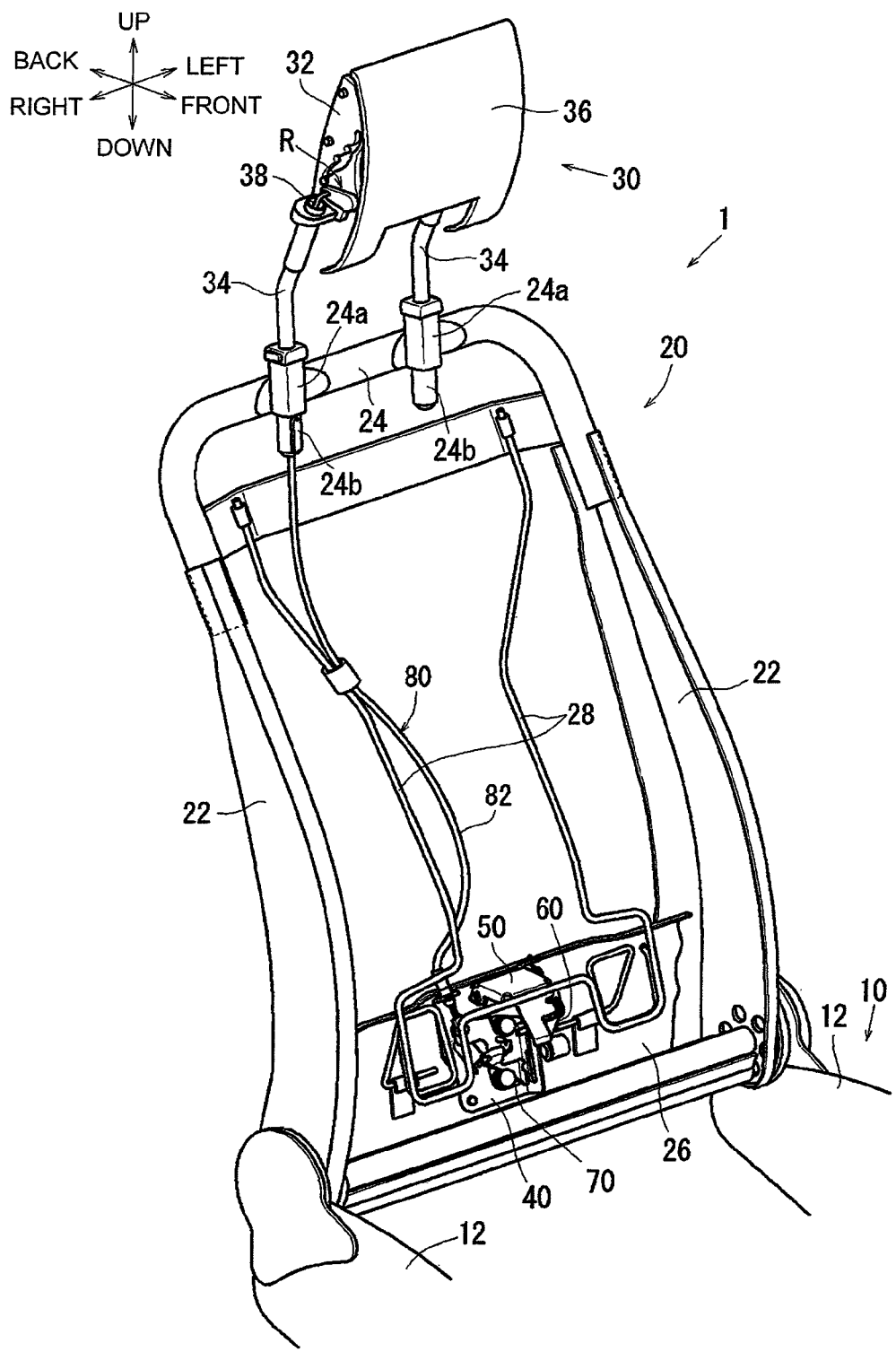
FIG. 1 is an entire schematic diagram of a vehicle seat including a clutch mechanism for a vehicle seat according to an exemplary embodiment of the present invention.
Figure 2:
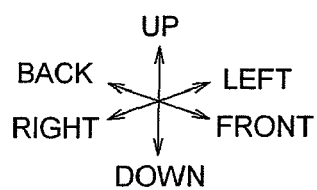
FIG. 2 is an enlarged view of the clutch mechanism of the vehicle seat.
Figure 2:
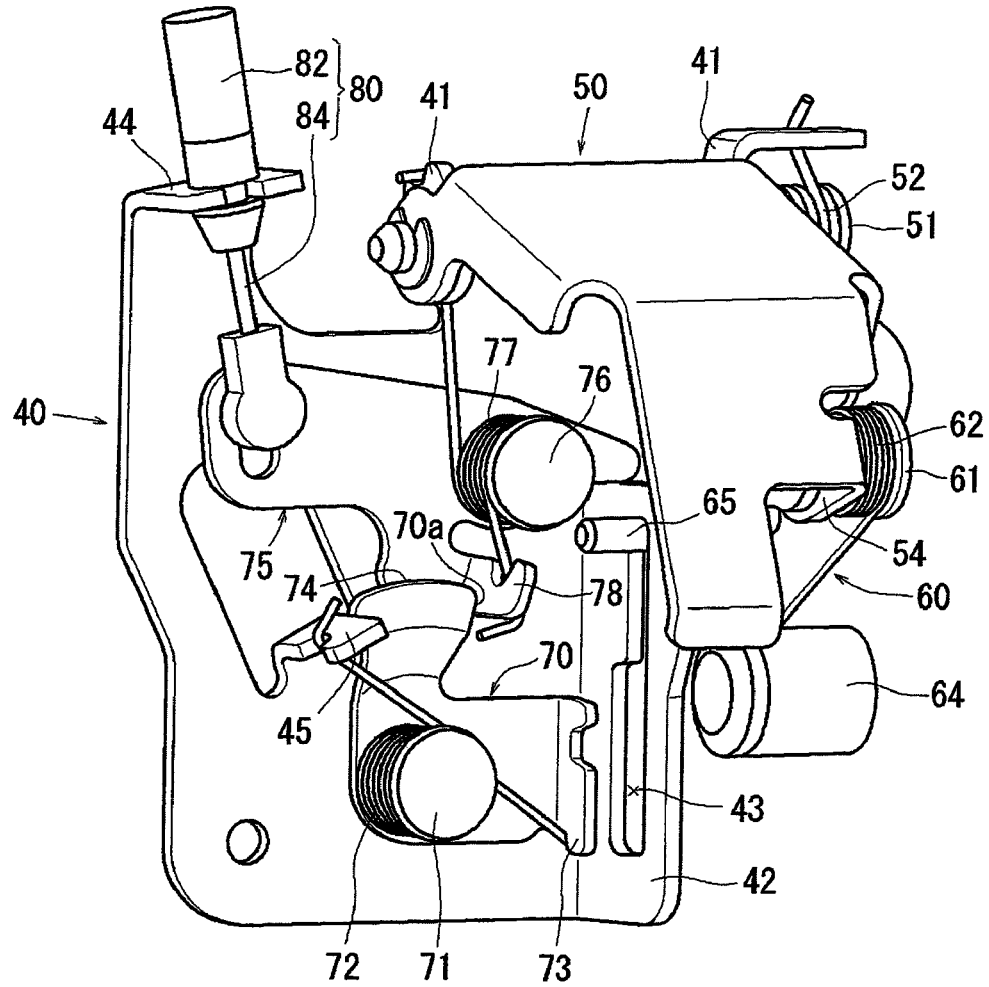
Figure 3:
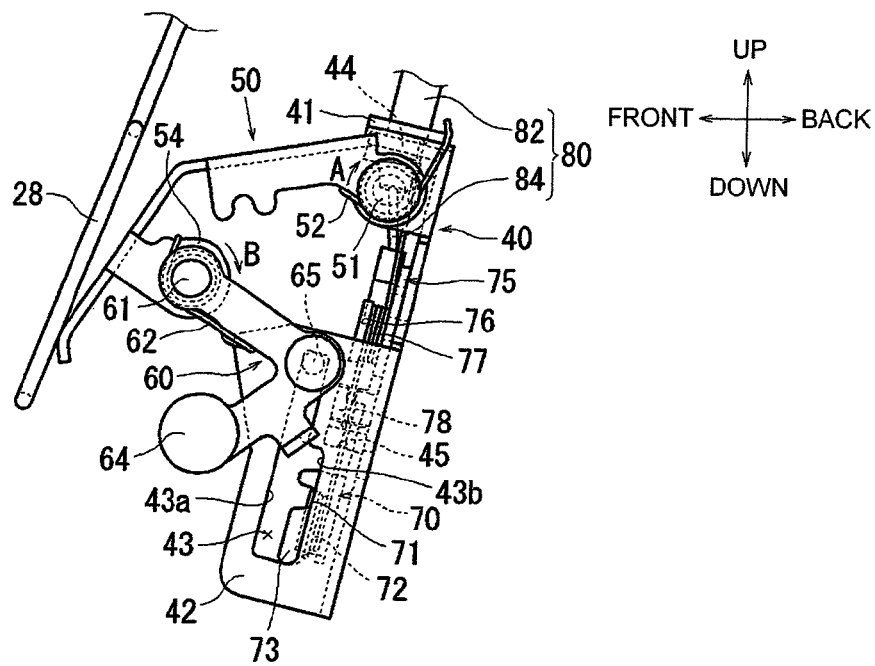
FIG. 3 is a side view of the clutch mechanism of the vehicle seat.
Figure 4:
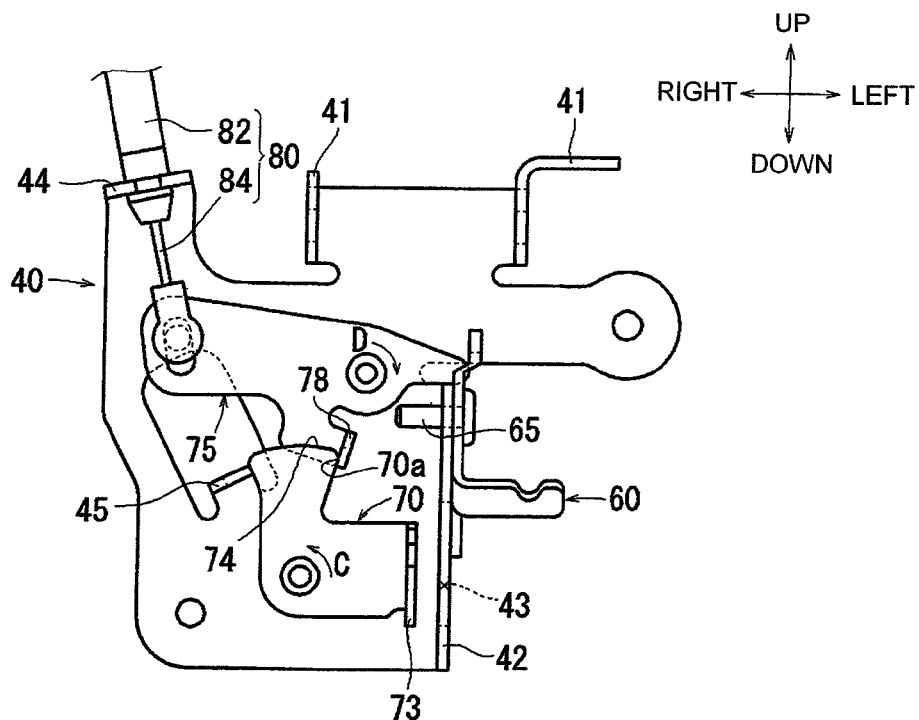
FIG. 4 is a front schematic diagram of the clutch mechanism of the vehicle seat.
Figure 5:
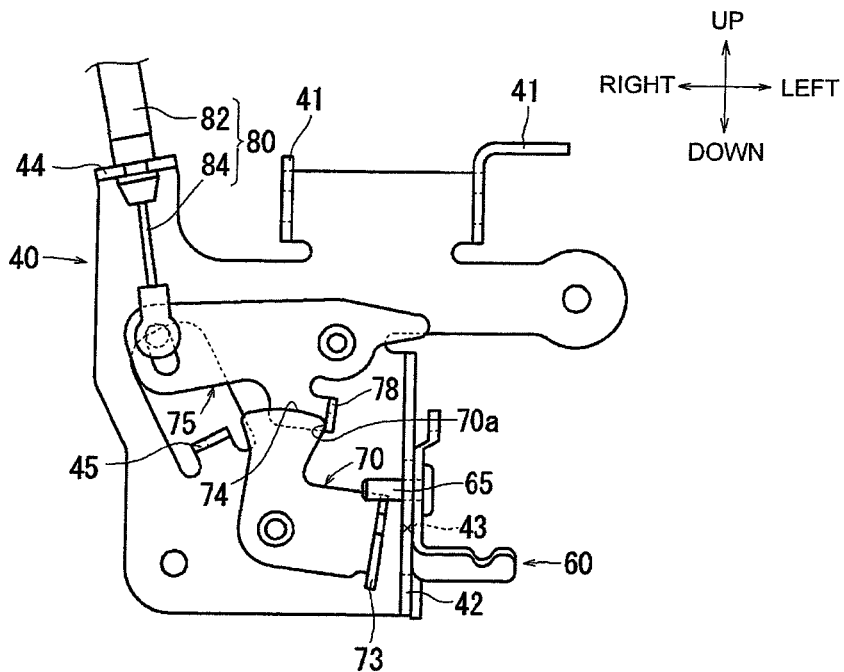
FIG. 5 is a front schematic diagram of the clutch mechanism of the vehicle seat achieved when the clutch mechanism starts receiving a seatback load due to a crash of a vehicle from behind.
Figure 6:
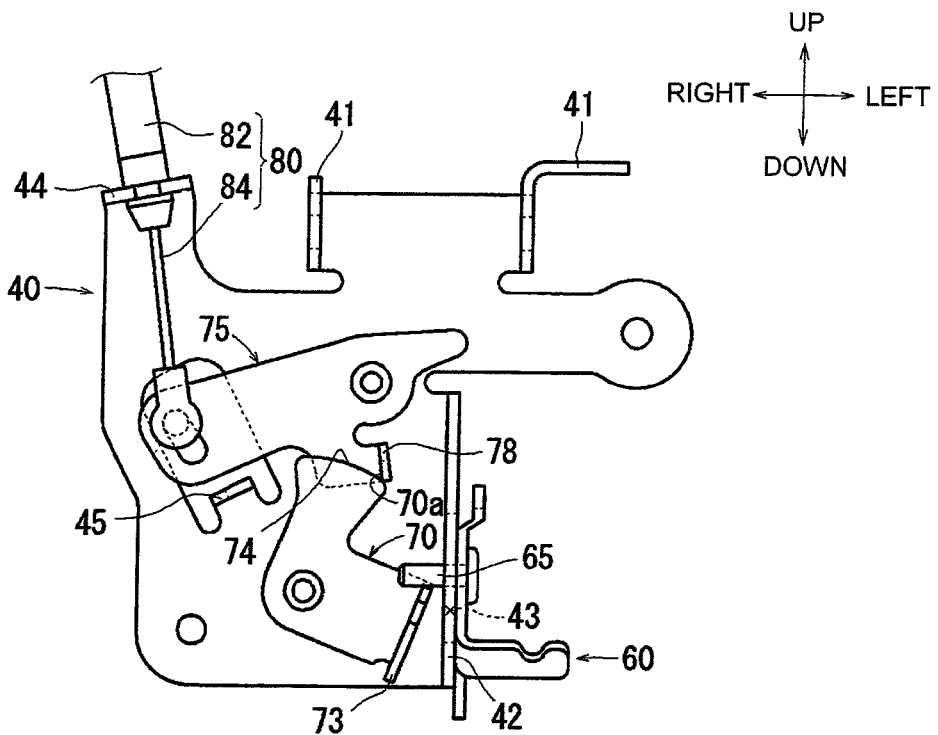
FIG. 6 is a front schematic diagram of the clutch mechanism of the vehicle seat achieved when the clutch mechanism receives a heavy seatback load.
Figure 7:
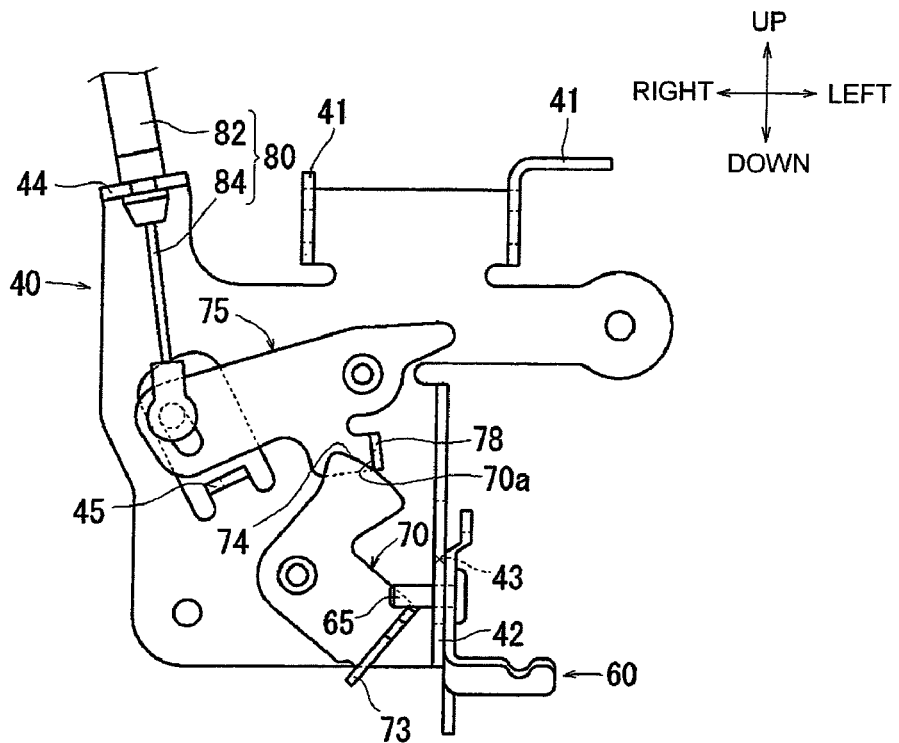
FIG. 7 is a front schematic diagram of the clutch mechanism of the vehicle seat achieved when the clutch mechanism continually receives a heavy seatback load.

Hereinafter, exemplary embodiments of the present invention will be described by reference to FIGS. 1 through 7. FIG. 1 is an entire schematic diagram of a vehicle seat including a clutch mechanism according to an exemplary embodiment of the present invention. FIG. 2 is an enlarged view of the clutch mechanism of the vehicle seat. FIG. 3 is a side view of the clutch mechanism of the vehicle seat. FIG. 4 is a front schematic diagram of the clutch mechanism of the vehicle seat. FIG. 5 is a front schematic diagram of the clutch mechanism of the vehicle seat achieved when the clutch mechanism starts receiving a seatback load due to a crash of a vehicle from behind. FIG. 6 is a front schematic diagram of the clutch mechanism of the vehicle seat achieved when the clutch mechanism starts receiving a heavy seatback load. FIG. 7 is a front schematic diagram of the clutch mechanism of the vehicle seat achieved when the clutch mechanism continually receives a heavy seatback load.

In order to make the understanding on the internal structure of a vehicle seat 1 including a seat cushion 10, and a seatback 20 which includes an active headrest 30 easy, a cushion structure and a surface structure of the seat are omitted from FIG. 1, and only an internal frame structure is shown in FIG. 1. In the following descriptions, the terms "up," "down," "front," "back," "left," and "right" refer to "up," "down," "front," "back," "left, and "right" directions provided in the drawings, respectively; that is, "up," "down," "front," "back," "left," and "right" directions based on the vehicle seat 1.

First, the overall configuration of the vehicle seat 1 according to the exemplary embodiment of the present invention is described. As shown in FIG. 1, the vehicle seat 1 includes the seat cushion 10 on which a passenger sits, the seatback 20 for a seated passenger which includes an active headrest 30 which supports the back of the seated passenger's head.

Among these constituent members, respective frame structures of the seatback 20 and the active headrest 30 will be described in detail. The frame of the seatback 20 includes a pair of side frames 22 and 22, an upper frame 24 extending across upper portions of the respective side frames 22, and a lower frame 26 extending across lower portions of the respective side frames 22.

Lower ends of the side frames 22 are attached to rear ends of a pair of cushion frames 12 and 12 of the seat cushion 10 by means of a reclining mechanism (not shown). The seatback 20 can thereby be tilted with respect to the seat cushion 10, and the seatback 20 can be retained at a desired posture within a tiltable range thereof.

A pair of holders 24a and 24a are attached to the upper frame 24. Supports 24b which enable engaged insertion of a pair of stays 34, 34 of the active headrest 30 to be described later are attached to the holders 24a, respectively. The active headrest 30 can thereby be attached to the seatback 20.

Among the supports 24b, one support 24b (the right support 24b in FIG. 1) is provided with an unlocking member (not shown) for unlocking a lock mechanism R of the active headrest 30. The unlocking member is connected to a second swinging member 75 to be described later, via an operation cable 80. The operation cable 80 is a double-structure cable member including an outer cable 82 having a cylindrical shape and a wire-shaped inner cable 84 inserted into the outer cable 82 to be movable within the outer cable 82. The operation cable 80 is an example of a transmission member.

One ends (upper ends) of the outer cable 82 and the inner cable 84 of the operation cable 80 are latched to the unlocking member. When tensile force acts on the inner cable 84, the unlocking member unlocks the lock mechanism R thorough the rod 38.

The frame of the active headrest 30 includes a base 32 defining the contour of the active headrest 30, a pair of stays 34 and 34 attached integrally to the base 32, and a support plate 36 attached to the base 32 by a link mechanism and by a tension spring (not shown). In normal times when a crash of a vehicle does not occur, the support plate 36 is locked by the lock mechanism R so as to be substantially integral with the base 32 against the restoration force of the tension spring.

The support plate 36 is configured to instantaneously spring out forwardly with respect to the base 32 by means of the link mechanism as a result of the link mechanism operating by the restoration force of the tension spring when the lock mechanism R is unlocked. Accordingly, it is possible to instantaneously support the back of the passenger's head. Since respective frame structures of the seatback 20 and the active headrest 30 are known configurations, their additional, detailed explanations are omitted here.

A clutch mechanism provided to the vehicle seat 1 will now be described. As shown in FIGS. 2 through 4, the clutch mechanism includes a base plate 40, a pressure-receiving member 50, a connecting arm 60, a first swinging member 70, and a second swinging member 75. The respective configuration members 40, 50, 60, 70, and 75 will be separately described below.

The base plate 40 is a member having a plate shape and constitutes a base of the clutch mechanism. The base plate 40 is fixed to a front surface of the lower frame 26. The base palate 40 is formed with a pair of first ribs 41 and 41, and a second rib 42 having an elongated hole 43.

The pressure-receiving member 50 has a substantially plate shape to be capable of receiving a seatback load from the passenger on the vehicle seat 1. The pressure-receiving member 50 is attached to the pair of first ribs 41 and 41 formed on the base plate 40 via a pin 51 so as to be rotatable around an axis extending in a widthwise direction (left-right direction) of the vehicle seat. The pressure-receiving member 50 is urged by a torsion spring 52 in a direction indicated by arrow A in FIG. 3, toward which the pressure-receiving member 50 contacts a bent spring 28 supporting a pad (not shown). The pressure-receiving member 50 is formed with a rib 54.

The connecting arm 60 has a substantially dogleg shape and transmits only a seatback load of the passenger occurring due to a crash of a vehicle from behind to the first swinging member 70 to be described later. The connecting arm 60 is provided with a pin 65 at a substantially dogleg portion thereof. The pin 65 can move within the elongated hole 43 formed in the second rib 42 of the base plate 40. Further, a weight 64 is attached to one end of the connecting arm 60.

A base end of the connecting arm 60 is attached to the rib 54 formed on the pressure-receiving member 50 via a pin 61 to be rotatable around an axis extending in the widthwise direction of the vehicle seat. The connecting arm 60 is urged by a torsion spring 62 in a direction indicated by an arrow B in FIG. 3 toward which the pin 65 of the connecting arm 60 contacts a front surface 43a of the elongated hole 43.

The first swinging member 70 transmits a seatback load from the connecting arm 60 to a second swinging member 75, which will be described later. The first swinging member 70 has a substantially L shape. The first swinging member includes a rib 73 formed at one end thereof and a circular-arc surface 74 formed on an outer peripheral surface at the other end thereof. The rib 73 is to be pushed by the pin 65 of the connecting arm 60. The circular-arc surface 74 configures a concentric circle around an axis of a pin 71 to be described later. In other words, the circular-arc surface 74 configures a part of a circle with a center about which the first swinging member 70 rotates.

The first swinging member 70 is attached to the base plate via a pin 71 at a substantially-L-shaped bent portion thereof so as to be rotatable around an axis perpendicular to a surface of the base plate 40. The first swinging member 70 is urged by the torsion spring 72 toward a direction in which the other end of the first swinging member 70 contacts a second hook 45 formed on the base plate 40 (in a direction of arrow C in FIG. 4).

The second swinging member 75 is a member which pulls the operation cable 80 by the seatback load from the first swinging member 70. The second swinging member 75 is formed with a hook 78 against which an edge 70a on the other end of the first swinging member 70 is pushed. The lower end of the inner cable 84 of the operation cable 80 is latched to the second swinging member 75. The lower end of the outer cable 82 of the operation cable 80 is latched to a first hook 44 formed on the base plate 40.

A substantially-center portion of the second swinging member 75 is attached to the surface of the base plate 40 via the pin 76 so as to be rotatable around the axis perpendicular to the surface of the base plate 40. The second swinging member 75 is urged by a torsion spring 77 toward a direction in which the hook 78 of the second swinging member 75 contacts the edge 70a of the other end of the first swinging member 70 (in a direction of arrow D in FIG. 4).

Next, an operation of the clutch mechanism will be described by reference to FIGS. 4 through 7. Upon receipt of a seatback load from the passenger in a state shown in FIG. 4 due to a crash of a vehicle from behind, the pressure-receiving member 50 starts rotating in a backward direction. Along with the rotating action, the connecting arm 60 is pushed downwardly while rotating with respect to the pressure-receiving member 50. The pin 65 of the connecting arm 60 moves downwardly within the elongated hole 43 by the pushing action.

Since backward inertia force remains acting on the weight 64 of the connecting arm 60 at this time due to a crash of a vehicle from behind, the pin 65 of the connecting arm 60 moves downwardly along a rear surface 43b among front surface 43a and back surface 43b of the elongated hole 43 against restoration force of the torsion spring 62 acting on the connecting arm 60. The pin 65 of the connecting arm 60 thereupon interferes with the rib 73 of the first swinging member 70. Accordingly, along with the interference, the first swinging member 70 rotates against the restoration force of the torsion spring 72 acting on the first swinging member 70.

Then, the edge 70a at the other end of the first swinging member 70 presses the hook 78 of the second swinging member 75. Accordingly, along with the pressing action, the second swinging member 75 also rotates against restoration force of the torsion spring 77 acting on the second swinging member 75. The inner cable 84 of the operation cable 80 is thereupon pulled, and tensile force acts on the thus-pulled inner cable 84. Then, as described above, the lock mechanism R is unlocked, whereupon the active headrest 30 springs out toward the back of the passenger's head (see FIG. 5).

In the operation of the clutch mechanism, if the passenger has a heavy weight, the pin 65 of the connecting arm 60 greatly moves downwards within the elongated hole 43. Since the amount of rotating action of the first swinging member 70 is also increased, the edge 70a at the other end of the first swinging member 70 moves over the hook 78 of the second swinging member 75 (see FIG. 6).

Accordingly, the circular-arc surface 74 at the other end of the first swinging member 70 becomes pushing the hook 78 of the second swinging member 75. As described above, the circular-arc surface 74 configures a concentric circle around the axis of the pin 71, and therefore, even when the amount of rotating action of the first swinging member 70 increases, the amount of rotating action of the second swinging member 75 does not increase along with the increase. When the circular-arc surface 74 on the other end of the first swinging member 70 thus becomes pushing the hook 78 of the second swinging member 75, the second swinging member 75 does not rotate and is held in a rotated state (the rotated state shown in FIG. 6) even if the first swinging member 70 further rotates in subsequent operation (see FIG. 7).

That is, the second swinging member is held in a rotated state achieved when the first swinging member rotates by a predetermined amount even when the first swinging member rotates by an angle larger than the predetermined angle." Herein, the "predetermined angle" is equivalent to the amount of rotating action of the first swinging member 70 achieved when the second swinging member 75 pulls the inner cable 84, to thus exert the tensile force required to unlock the lock mechanism R and that is a matter of design.

In the operation of the clutch mechanism, when simply seatback load is exerted on the pressure-receiving member 50 without a crash of a vehicle from behind, that is, when the pressure-receiving member 50 receives a seatback load from the passenger as a result of mere a passenger leaning against the seatback 20, the pin 65 of the connecting arm 60 moves downwardly along the front surface 43a among the front surface 43a and back surface 43b of the elongated hole 43 by restoration force of the torsion spring 62 acting on the connecting arm 60. As a result, the pin 65 of the connecting arm 60 does not interfere with the rib 73 of the first swinging member 70, nor does the first swinging member 70 rotate. Therefore, the active headrest 30 does not spring out toward the back of the passenger's head.

The clutch mechanism according to the exemplary embodiment is configured as described above. Even tensile force is exerted on the operation cable 80 by a seatback load of the passenger due to a crash of a vehicle from behind and when the seatback load of the passenger is heavy weight, the configuration makes it possible to prevent excessive exertion of the tensile force on the operation cable 80.

The second swinging member 75 may be provided to rotate along the first swinging member 70 in a same rotation direction as the first swinging member 70. However, since the rotation direction of the second swinging member 75 is opposite to that of the first swinging member 70, the arrangement and the configuration of the first swinging member 70 and the second swinging member 75 become simple.

This configuration makes it possible to unlock the lock mechanism R by the seatback load of the passenger occurring due to a crash of a vehicle from behind. By the unlocking action, it is possible to cause the support plate 36 of the active headrest 30 to spring out toward the back of the passenger's head. Therefore, when the vehicle is crashed from behind, the back of the passenger's head can instantaneously be received.

While the present invention has been shown and described with reference to certain exemplary embodiments thereof, it will be understood by those skilled in the art that various changes in form and details may be made therein without departing from the spirit and scope of the invention as defined by the appended claims.

For example, in the above-described exemplary embodiment, the connecting arm 60 is pushed downwardly while rotating with respect to the pressure-receiving member 50. However, the present invention is not limited thereto. The connecting arm 60 may also be configured so as to be pushed upwardly while rotating with respect to the pressure-receiving member 50.

In the above-described exemplary embodiment, the clutch mechanism is used for activating the active headrest 30. However, the present invention is not limited thereto. The clutch mechanism according to the exemplary embodiment can be used to any devices which operate in response to a crash of a vehicle from behind.

What is claimed is:

1. A clutch mechanism for a vehicle seat, the clutch mechanism comprising:
   a pressure-receiving member rotatably assembled to a frame of a seatback of the vehicle seat;
   a connecting arm having a weight and provided rotatably to the pressure-receiving member;
   a first swinging member provided rotatably to the frame of the seatback of the vehicle seat, wherein while inertia force occurring due to a crash of a vehicle from behind acts on the weight, when the pressure-receiving member rotates upon receipt of a seatback load of a passenger of the vehicle seat, the connecting arm causes the first swinging member to rotate along with the rotation of the pressure-receiving member; and
   a second swinging member provided rotatably to the frame of the seatback, and configured to rotate along with the rotation of the first swinging member,
   wherein the second swinging member is held in a rotated state achieved when the first swinging member rotates by a predetermined angle even when the first swinging member rotates by an angle larger than the predetermined angle.

2. The clutch mechanism according to claim 1,
   wherein along with the rotation of the first swinging member in a first direction, the second swinging member rotates in a second direction opposite to the first direction.

3. The clutch mechanism according to claim 1,
   wherein the first swinging member includes a rib formed at one end thereof for contacting the connecting arm, and a circular-arc surface formed at the other end thereof for contacting the second swinging member,
   wherein the circular-arc surface configures a part of a circle with a center about which the first swinging member rotates,
   wherein the second swinging member is rotated along with the rotation of the first swinging member by contacting an edge of the circular-arc surface, and
   wherein the second swinging member is held in the rotated state by contacting the circular-arc surface of the first swinging member when the first swinging member rotates by more than the predetermined angle.

4. The clutch mechanism according to claim 1,
   wherein the frame includes a rib formed with an elongated hole,
   wherein the connecting arm includes a pin which is movable in the elongated hole,
   wherein when the inertia force occurring due to a crash of a vehicle from behind acts on the weight, the pin of the connecting arm moves along a first surface of the elongated hole to contact with the first swinging member, and
   wherein when the inertia force does not act on the weight, the pin of the connecting arm moves along a second face opposite to the first surface without contacting with the first swinging member.

5. The clutch mechanism according to claim 1,
   wherein the seatback includes a lock mechanism,
   wherein the lock mechanism is connected to the second swinging member via a transmission member, and
   wherein the lock mechanism is unlocked via the transmission member along with the rotation of the second swinging member.

6. The clutch mechanism according to claim 5,
   wherein the seatback includes an active headrest assembled thereto, the active headrest including a support plate which springs toward a back of the passenger's head, and
   wherein the support plate is held by the lock mechanism in an initial state achieved before the support plate springs out, and springs out toward the back of the passenger's head along with the unlocking of the lock mechanism.

* * * * *